United States Patent [19]

Flippo

[11] 4,191,094
[45] Mar. 4, 1980

[54] POWER DRIVE UNIT

[75] Inventor: Robert V. Flippo, Rockford, Ill.

[73] Assignee: Sundstrand Corporation, Rockford, Ill.

[21] Appl. No.: 900,313

[22] Filed: Apr. 26, 1978

[51] Int. Cl.² ............................ F01B 3/06; F04B 1/30; F16D 31/02
[52] U.S. Cl. ........................................ 91/506; 91/380; 417/217; 60/421; 60/226 A
[58] Field of Search .................. 91/506, 380, 384, 497; 417/217, 222; 60/421, 226 A

[56] References Cited

U.S. PATENT DOCUMENTS

| | | | |
|---|---|---|---|
| 2,863,422 | 12/1958 | Mercier et al. | 91/384 |
| 3,163,115 | 12/1964 | Neff et al. | 417/222 |
| 3,181,427 | 5/1965 | Magnuson | 91/497 |
| 3,186,310 | 6/1965 | Neff et al. | 417/222 |
| 3,669,570 | 6/1972 | Himmler | 91/506 |
| 3,877,839 | 4/1975 | Fleld | 417/217 |
| 3,999,387 | 12/1976 | Knopf | 60/451 |

Primary Examiner—William L. Freeh
Attorney, Agent, or Firm—Wegner, Stellman, McCord, Wiles & Wood

[57] ABSTRACT

A power drive unit for operation of structure in opposite directions, such as aircraft structure and, particularly, thrust reverser structure of an aircraft engine operable between stow and deploy positions, including, a bi-directional hydraulic motor having a variably positionable wobbler for controlling displacement of the motor. Control structure includes a valve for causing fluid flow through the motor in either of two directions, a control cylinder and piston connected to the wobbler for setting the motor at either minimum or maximum displacement conditions or at any condition therebetween, a servo valve operable for setting the position of the piston in the control cylinder, and a differential area piston operatively connected to the servo valve for positioning thereof and responsive to the pressure drop across the motor in either direction of operation thereof to set the motor displacement at the least value possible for the load condition on the motor.

10 Claims, 2 Drawing Figures

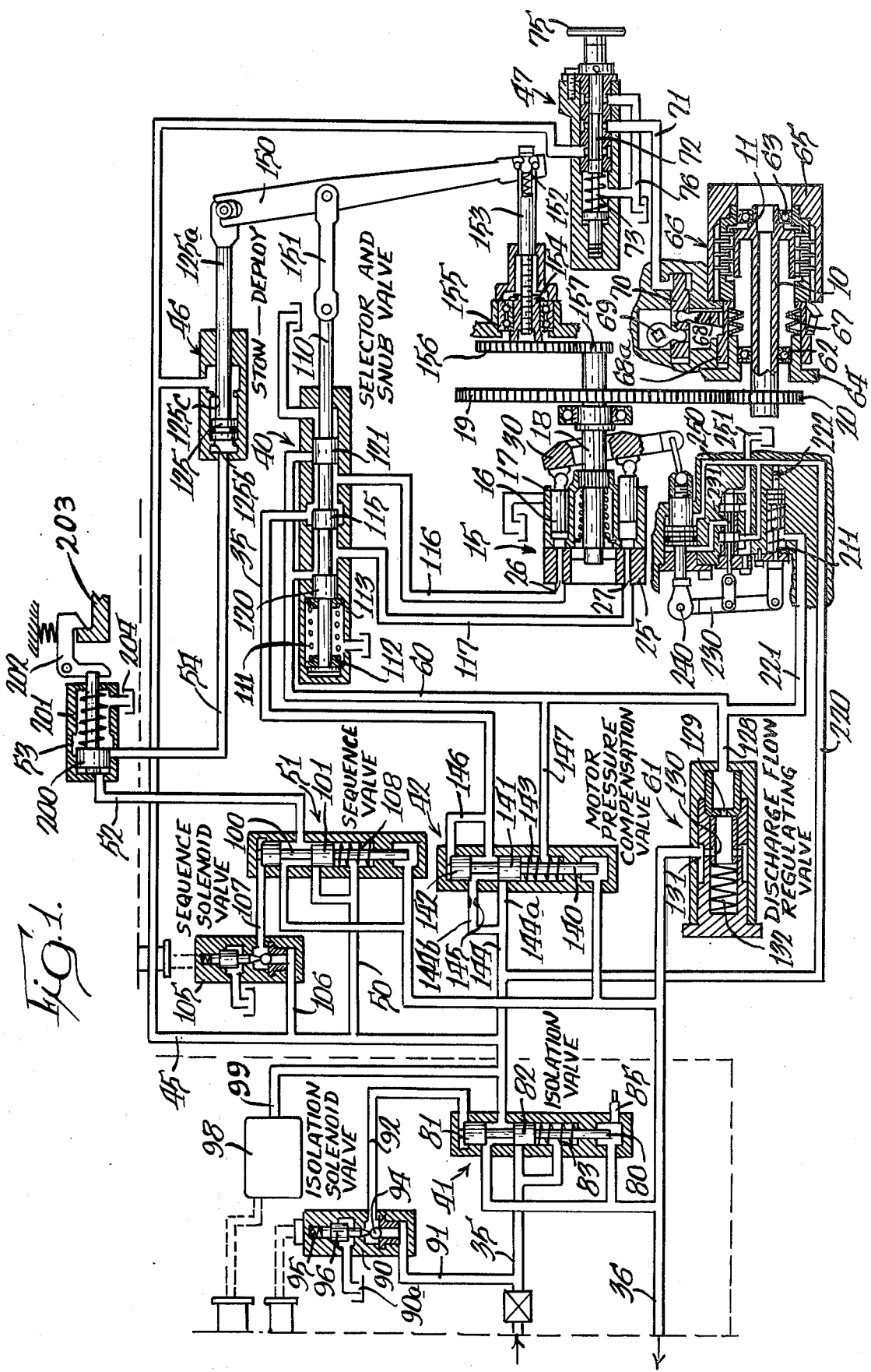

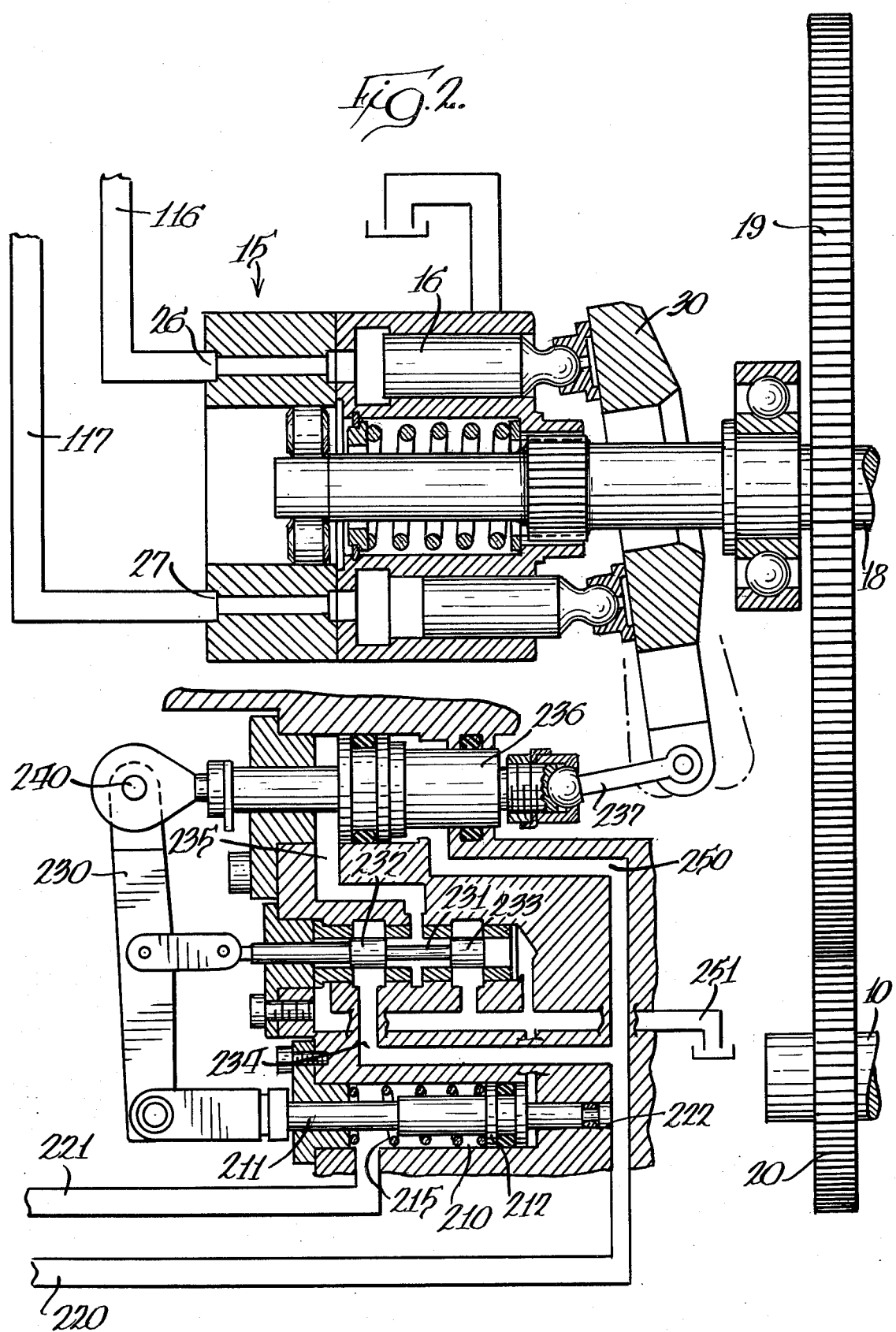

POWER DRIVE UNIT

BACKGROUND OF THE INVENTION

This invention pertains to a power drive unit utilizing a hydraulic power supply for operation of a structure by a fluid-operated hydraulic motor and which places different loads on the motor during a cycle of operation and having means sensing the load on the motor to set the motor displacement at the least value possible for the load condition on the motor.

Power drive units having a hydraulic fluid supply have many different uses with one particular use being in the aircraft field where the unit is utilized for powering aircraft engine structure, such as thrust reversers which must be moved between stow and deploy positions. Power driven units have included air motors for operation of such structure and the prior art also includes the use of a hydraulic bi-directional motor, with the motor having a fixed displacement.

In operation of certain structure, such as thrust reversers, there are varying torque demands on the motor during the cycle of operation and in using a fixed displacement motor, the motor must be set to an adequate displacement to provide the necessary maximum torque requirement and with the fixed displacement and constant hydraulic fluid supply it is not possible to provide for increased speed of the motor when there are lesser torque demands on the motor.

The prior art includes a power driven unit having a hydraulic power supply and which has a system for operating thrust reverser structure in stow and deploy cycles. An axial piston motor has a wobbler which is set in one displacement position in one of the stow-deploy operations and which is set in another, or one of two different other displacement positions, in the other of said operations. This prior art unit does not optimize the displacement of the motor at all times to always maintain only the minimum displacement required for the necessary torque during all operations provided by operation of the motor in both directions. This system is shown in an application of Allyn M. Aldrich, entitled "POWER DRIVE UNIT," Ser. No. 900,312, filed Apr. 26, 1978.

SUMMARY OF THE INVENTION

A primary feature of the invention disclosed herein is to provide a power drive unit for imparting drive to a mechanism with different torque demands at different times in the cycle of operation and which, at all times, establishes only the smallest displacement required to provide the necessary torque for the mechanism, with the result that the mechanism is always operated at the maximum possible speed for each load condition which minimizes energy waste.

An object of the invention is to provide a power drive unit for imparting two-directional drive to a mechanism with different torque demands at different times in the cycle of operation comprising, a bi-directional motor with displacement-varying means, a control cylinder having a piston connected to the displacement-varying means, a first circuit connected to the motor and including a valve for controlling the direction of flow to the motor, a second circuit connected to the control cylinder including servo valve means for controlling the position of the piston in the cylinder to control the position of the displacement-varying means, and motor torque sensing means operable in both directions of motor rotation for positioning of said servo valve means.

Another object of the invention is to provide a power drive unit for thrust reverser structure to impart movements thereto in either of two directions for either stow or deploy operation comprising, a bi-directional axial piston motor, an adjustable wobbler for controlling the stroke of the motor pistons, a first valve connected to ports of the motor for controlling the direction of fluid flow to the motor, a first cylinder with a piston having differential areas responsive to fluid pressure for setting the position of said first valve, a fluid circuit including supply and return lines with said lines extended to said first valve, a first control valve in said supply line and movable between positions to open and close the supply line, a supply line branch extended to said first cylinder to act on the lesser area of the piston therein, a second supply line branch operatively connected to said control cylinder to act on the larger area of the piston therein, a second control valve in said second supply line branch and movable between positions to open and close the second supply line branch, a control cylinder for said wobbler including a piston connected to the wobbler, a servo valve for directing operating fluid to and from said control cylinder, a torque sensing piston member having differential areas, means mechanically connecting said wobbler connected piston, said servo valve and said torque sensing piston whereby movement of either the torque sensing piston or the wobbler connected piston causes movement of the servo valve, means connected to the supply line for applying supply line pressure to the lesser area of the torque sensing piston, a flow restricting device in the return line, means connected to the return line ahead of the flow restricting device for applying motor outlet pressure to the larger area of the torque sensing piston, and means for urging said torque sensing piston toward a position to establish a minimum stroke position for said axial pistons, said torque sensing piston areas being related to permit a range of positions of said axial pistons with different values of pressure difference between said supply and return lines.

BRIEF DESCRIPTION OF THE DRAWING

FIG. 1 is a schematic of the power drive unit with certain components shown in central vertical section; and FIG. 2 is an enlarged view of the wobbler control structure.

DESCRIPTION OF THE PREFERRED EMBODIMENT

The power drive unit is provided for operation of mechanism (not shown) having a drive train which connects into a tubular rotatable shaft 10, as by fitting a flexible shaft into an interior opening 11 thereof. The rotatable shaft 10 is rotated in either of two directions by a variable displacement hydraulic motor, indicated generally at 15, and which, in the form shown, is an axial piston motor. As well known in the art, an axial piston motor has a series of pistons 16 carried within a series of longitudinal bores in a cylinder block 17 which connects to an output shaft 18. The shaft 18 has a gear 19 meshing with a gear 20 on the rotatable shaft 10. A valve block 25, forming part of the motor, has a pair of ports 26 and 27 for directing pressure fluid through the motor. The displacement of the motor may be varied by varying the stroke of the pistons 16. This is accomplished by positioning of a wobbler 30, which may be set at various angles. As shown in FIG. 1, it is shown in full line in an intermediate displacement establishing position. The minimum displacement position is indicated by broken line to the left thereof and the maximum displacement position is indicated by broken line to the right thereof, with these positions being established by structure subsequently described.

The fluid circuit associated with the motor includes a supply line 35 and a return line 36, with the supply line and return line both extending to a selector and snub valve, indicated generally at 40. The supply line 35 has an isolation valve 41 connected therein for opening and closing said line. Additionally, a motor pressure compensator valve 42 is in said supply line, for a purpose to be described.

A first supply branch line 45 extends to a linkage actuator cylinder 46 and to a manual brake disable valve 47. A second supply branch line 50 connects to a sequence valve 51, with the output of the sequence valve being connected by a line 52 to a latch release actuator 53 and with flow therethrough to a line 54, which connects to the linkage actuator cylinder 46.

The return line 36 has a section 60 extending from the selector and snub valve 40 and connected to a discharge flow regulating valve 61.

The rotatable shaft 10 is mounted by bearings 62 and 63 to stationary housing parts 64 and 65 and with a brake 66 having interleaved brake plates keyed alternately to the shaft and the interior of the housing section 65. The brake is normally active under the urging of Belleville springs 67 compressing the brake plates to hold the shaft 10 against rotation. The brake can be released by counter-clockwise pivoting of a release lever 68 to relieve the spring pressure. The pivoting of the lever 68 shifts a sleeve 68a. A mechanically rotatable member 69 is connected to the release lever 68 by a hydraulic ram 70 for manual release of the brake to permit rotation of the rotatable shaft 10.

The manual brake disable valve 47 controls the supply of pressure fluid from the branch supply line 45 to the hydraulic ram 70 through a line 71 connected between the valve 47 and the hydraulic ram 70. The valve 47 has a valve stem 72 urged to the right, as shown in FIG. 1, by a spring 73 to position the valve lands to permit pressure fluid flow to the hydraulic ram 70 for shift thereof to the left to release the brake when there is pressure in branch supply line 45. The valve 47 can be shifted to a position to block fluid supply line 45 by rotation of a hand wheel 75. This shifts the valve stem 72 to the left against the action of the spring 73 and directs pressure fluid from line 71 to a return line connection 76.

The isolation valve 41 has a valve spool 80 with a pair of lands 81 and 82. A spring 83 and supply pressure within the valve housing urges the spool upwardly to have the land 82 close off the supply line 35. If it is desired to prevent lowering movement of the valve spool, a pin 85 may be moved manually inwardly to obstruct downward movement of the valve spool.

The entire power drive unit is inactive when the spool 80 is in its upper position. In order to activate the system, a solenoid pilot valve 90 is opened to direct pressure fluid through lines 91 and 92 to the upper end of the valve spool 80 and shift it downwardly against the action of the spring 83 and supply pressure which lowers the land 82 and opens the supply line. The pilot valve 90 has a ball valve member 94 normally urged to closed position against a seat by a spring 95 acting on an armature 96 and a solenoid coil which, upon energization, raises the armature to permit flow through the pilot valve. A return line 90a receives flow after the pilot valve member 94 closes to permit return of valve member 80 to its upper position.

The existence of pressure in the system downstream of the isolation valve 41 is established by a pressure detection switch 98 connected to the supply line by a line 99 and which can electrically signal the pressure condition.

The power drive unit has two distinct modes of operation and it is necessary, for activation of the isolation valve 41, for both modes. The sequence valve 51 is only activated in one of the modes and, specifically, the deploy mode when the power drive unit is utilized for stow and deploy operation of the thrust reverser structure. The sequence valve 51 has a valve spool 100 and with a land 101 normally operating to block the second branch supply line 50. Upon energization of a solenoid pilot valve 105, pressure fluid can flow through lines 106 and 107 from the first branch supply line 45 to the upper end of the valve spool 100 and shift the spool downwardly against the action of a spring 108 and supply pressure from line 50 whereby pressure fluid can flow to line 52 which extends to the latch release cylinder 53. The solenoid pilot valve 105 is of the same construction as the solenoid pilot valve 90.

The selector and snub valve 40 has a valve member 110 operable in a casing and which is normally urged to the stow position shown in FIG. 1 by a spring 111 acting between ring members 112 and 113 which are movable on the valve member and have limit positions under the urging of the spring 111 determined by engagement with shoulders on the casing of the valve. In this bias position, the valve permits limited flow to the motor. A central valve land 115 controls the delivery of pressure fluid from the supply line 35 to one or the other of lines 116 and 117 extending to the motor valve ports 26 and 27 with a minimum pressure drop. The outer lands 120 and 121 control communication of one of the lines 116 or 117 to the return line section 60 for fluid discharged from the motor.

The linkage actuator 46 has a differential area piston 125 movable within a cylinder and with a piston rod 125a extending outwardly thereof. The larger area of the piston communicates with the line 54 extended from the latch release cylinder while the smaller rod end area communicates with the first branch supply line 45. The movement of the piston is limited by shoulders 125b and 125c.

The discharge flow regulating valve 61 controls the speed of the motor 15 and is of a conventional structure, with fluid entering from line 60 at 128 and flowing through an orifice 129 in a cup-shaped valve member. The valve member has ports 130 communicating with fixed casing ports 131 which communicate with the return line 36. The orifice 129 creates a pressure drop thereacross and when a certain flow rate is exceeded, the differential pressure is sufficient to shift the valve member to the left and compress the spring 132 whereby the ports 130 and 131 restrict outlet flow. As a result, the maximum flow rate through the return line is controlled.

The motor pressure compensator valve 42 has a valve spool 140 with lands 141 and 142 and is urged upwardly by a spring 143. Upon energization of the system, fluid flows to a line 144 having branches 144a and 144b, with the latter having a fixed orifice 145. Flow can only continue through branch 144b since land 141 blocks branch 144a. This flow passes to pilot line 146 and shifts the valve spool 140 downwardly to lower land 141 and permit full flow through the valve. A pilot passage 147 branches from return line section 60 for a purpose to be described.

The piston rod 125a of the linkage actuator is connected to one end of a control link 150. This control link intermediate its ends is connected to the valve member 110 of the selector and snub valve 40 through an intermediate link 151 to establish the operating condition of the valve. The opposite end of the control link 150 is connected through a rigging adjustment 152 to a threaded shaft 153 which threadably engages within a nut 154. The nut 154 is mounted within a part of the housing by bearings 155 and is rotated by a gear 156 which meshes with a gear 157 on the motor output shaft 18. This structure provides a feedback mechanism to control snub timing whereby motor rotation and resulting operation of the mechanism powered thereby is monitored to provide a variation in speed of motor operation near the end of a cycle. This is accomplished by the feedback mechanism shifting the valve member 110 of the selector and snub valve 40 to a position near the end of the cycle where the valve land 115 limits fluid flow to the motor.

The power drive unit is shown de-energized and with a part of a thrust reverser structure stowed. When the thrust reverser structure is to be deployed, the solenoid pilot valve 90 is operated to shift the valve spool of the isolation valve 41 and cause delivery of hydraulic pressure fluid through the supply line 35 to the motor pressure compensator valve 42 for downward shift thereof and to the selector and snub valve 40. Fluid flows through the first branch supply line 45 to release the brake 66 and permit rotation of the rotatable shaft 10. Additionally, the solenoid pilot valve 105 is energized to cause shift of the sequence valve 51 whereby pressure fluid flows through the second branch supply line 50 to the latch release cylinder 53. This urges a piston 200 to the right against the action of a spring 201 to pivot a latch 202 counterclockwise and release a part 203 of the thrust reverser structure. This latch release cylinder serves as an interlock whereby after the piston 200 has moved to the right, communication is established between the line 52 and the line 54. This results in pressure against the large pressure area of the actuator piston 125 which shifts the piston rod 125a to the right, and through the control link 150, moves the selector and snub valve spool 110 to the right. This results in pressure fluid being applied to the line 117 to cause rotation of the motor in one direction and with fluid from the motor flowing through line 116 and to the return line section 60. As the motor operates, the feedback mechanism causes movement of the valve spool 110 to the left because of the piston rod 125a being fixed in position and the central land 115, near the end of the deploy operation, gradually reduces flow to the line 117 to progressively stop the motor.

In a stow operation, the sequence valve 51 is not activated, with the result that pressure in the first branch supply line 45 applied to the smaller area of the piston 125 of the linkage actuator 46 results in shifting the piston rod 125a to the left. This is permitted by backward flow through line 54 to the latch release cylinder 53 and return to tank through a return connection 204. This movement of the piston rod to the left shifts the valve member 110 to the left to cause pressure fluid to flow through line 116 to the motor for rotation in the opposite direction. The fluid outflow from the motor through line 117 flows to the return branch line 60. Again, the feedback mechanism operates near the end of the stow cycle to reposition the valve member 110 to reduce flow near the end of the stow cycle.

With the structure shown, there is pressure acting continuously through branch supply line 45 on the actuator piston 125 to bias the unit in a stow direction for return of the operated structure to a stow position in the event of a deploy signal failure.

The motor pressure compensator valve 42 functions to protect the motor by limiting motor pressure when the thrust reverser structure is acting as an aiding load rather than a resisting load. The valve senses high outlet pressure through line 147 and shifts the valve spool 140 upwardly to have the land 141 block the branch 144a and cause supply flow through orifice 145 which drops motor inlet pressure to an acceptable level.

The foregoing description discloses the basics of a prior power drive unit. In operation of certain structures, such as thrust reverser structure, there are varying load conditions exerted on the motor 15. There can be relatively high break-out torque requirements on initial movement of the structure, as well as varying torque requirements during the cycle of operation. In addition to resisting loads, there can be times in the cycle of operation in which the structure imparts an aiding load on the motor.

The power drive unit disclosed herein provides for infinitely variable positioning of the wobbler 30 to have the wobbler angle change to vary the displacement of piston 16 as required by the load to optimize the displacement of the motor to the minimum displacement necessary to provide the torque required for operation. This minimizes energy waste and provides the maximum speed possible for each load condition at a constant hydraulic fluid flow through the motor.

The positioning of the wobbler 30 is controlled by torque sensing structure which senses the pressure drop across the motor and which represents motor torque. This torque sensing structure includes a cylinder 210 having a rod 211 with a piston 212. The rod 211 is spring-urged toward the right by a spring 215. The structure senses the pressure drop across the motor by a pair of lines including a line 220 which extends to the line 144 forming part of the supply line system and a line 221 which connects to the return line section 60. There is minimal pressure drop through the selector and snub valve 40 whereby the pressure in line 220 is representative of the fluid inlet pressure to the motor. With the discharge flow regulating valve 61 providing a flow restriction in the return line, the pressure in line 221 is representative of the pressure of the fluid discharged from the motor. The motor inlet pressure acts on a reduced end 222 of the rod 211, while the return pressure acts on a larger area of the piston 212 and exerts a force in the same direction as that exerted by the spring 215. The spring normally biases the rod 211 to an initial position to control a servo valve stem 231. The rod 211 connects to a control and feedback member 230 which is pivotally connected to the stem 231 of a servo valve having a pair of valve lands 232 and 233. The valve land 232 controls the delivery of pressure fluid from a passage 234 to a passage 235 leading to a control cylinder having a differential area piston 236 operatively connected to the wobbler 30 through a link 237 having a swivel connection. Piston 236 is also pivotally-connected to the control member 230 at 240.

The control member 230 enables positioning of the servo valve by the torque sensing structure and also provides a feedback whereby movement of the wobbler controlling piston 236 can return the servo valve to a null position.

The structure of the torque sensing means including the spring 215 and the differential areas of the sensing piston 212 acted upon by the motor inlet and outlet pressures establishes the wobbler 30 in a minimum displacement position for a lower torque high speed operation. A torque increase in the motor results in a lowering of the pressure at the outlet side of the motor which is sensed through line 221 and when the resulting pressure difference exceeds a certain value, the torque sensing means functions to increase the displacement angle of the wobbler 30 to establish a higher torque lower speed operation. At a certain pressure differential value, the torque sensing structure will place the wobbler 30 at a maximum displacement position. It will thus be seen that the wobbler can be moved to increasing displacement positions to provide for additional torque output from motor 15. However, only the necessary torque is provided by the motor at all times, so that the motor can operate at the fastest speed possible. As an example, the structure in one embodiment has the differential areas and the spring of the torque sensing structure set to maintain the wobbler in a minimum displacement position until the pressure differential across the motor is lightly in excess of 2,000 psi. Above this value, the structure operates to increase the displacement position of the wobbler and with the wobbler being at maximum displacement position at a pressure differential of approximately 2250 psi.

As previously stated, as the wobbler 30 moves to a new position, this motion is transmitted through the control member 230 to bring the servo valve to a null position. The control piston 236 has a larger area acted upon by pressure as controlled by the servo valve and the smaller area subject to supply pressure through a passage 250. When the wobbler 30 is to move toward a reduced displacement position, the servo valve spool 231 moves to a position to connect passage 235 to a return line 251.

I claim:

1. A power drive unit for imparting two-directional drive to a mechanism with different torque demands at different times in the cycle of operation with operation at the maximum speed possible for each load condition at a constant hydraulic flow through a bi-directional motor with displacement-varying means, comprising, in addition to said motor, a control cylinder having a piston connected to said displacement-varying means, a first conduit connected to said motor and including a valve for controlling the direction of flow to the motor, a second circuit connected to said control cylinder including servo valve means for controlling the position of the piston in the cylinder to control the position of said displacement-varying means, and motor torque sensing means including means for sensing the pressure drop across the motor without waste of energy in the hyraulic system and operable in both directions of motor rotation for positioning of said servo valve means.

2. A power drive unit as defined in claim 1 including a feedback mechanism acting on said servo valve and responsive to movement of the displacement-varying means.

3. A power drive unit as defined in claim 1 wherein said motor torque sensing means includes a differential area piston, means for applying motor inlet fluid pressure to the lesser area of the piston, and means for applying motor outlet fluid pressure to the larger area of the piston.

4. A power drive unit for thrust reverser structure to impart movements thereto in either of two directions for either stow or deploy operation comprising, a bi-directional axial piston motor, an adjustable wobbler for controlling the stroke of the motor pistons, a first valve connected to ports of the motor for controlling the direction of fluid flow to the motor, a first cylinder with a piston having differential areas responsive to fluid pressure for setting the position of said first valve, a fluid circuit including supply and return lines with said lines extending to said first valve, a first control valve in said supply line and movable between positions to open and close the supply line, a supply line branch extended to said first cylinder to act on the lesser area of the piston therein, a second supply line branch operatively connected to said first cylinder to act on the larger area of the piston therein, a second control valve in said second supply line branch and movable between positions to open and close the second supply line branch, a control cylinder for said wobbler including a piston connected to the wobbler, a servo valve for directing operating fluid to and from said control cylinder, a torque sensing piston member having differential areas, means mechanically connecting said wobbler connected piston, said servo valve and said torque sensing piston whereby movement of either the torque sensing piston or the wobbler connected piston causes movement of the servo valve, means connected to the supply line for applying supply line pressure to the lesser area of the torque sensing piston, a flow restricting device in the return line, means connected to the return line ahead of the flow restricting device for applying motor outlet pressure to the larger area of the torque sensing piston, and means for urging said torque sensing piston toward a position to establish a minimum stroke position for said axial pistons, said torque sensing piston areas being related to permit a range of positions of said axial pistons with different values of pressure difference between said supply and return lines.

5. A power drive unit for structure to impart movements thereto in either of two directions comprising, a bi-directional axial piston motor, an adjustable wobbler for controlling the stroke of the motor pistons, a first valve connected to ports of the motor for controlling the direction and volume of fluid flow to the motor, means for setting the position of said first valve, a fluid circuit including supply and return lines with said lines extended to said first valve, a first control valve in said supply line and movable between positions to open and close the supply line, a control cylinder for said wobbler including a piston connected to the wobbler, a servo valve for directing operating fluid to and from said control cylinder, a torque sensing piston member having differential areas, means mechanically connecting said wobbler connected piston, said servo valve and said torque sensing piston whereby movement of either the torque sensing piston or the wobbler connected piston causes movement of the servo valve, means connected to the supply line for applying supply line pressure to the lesser area of the torque sensing piston, a flow rstricting device in the return line, means connected to the return line ahead of the flow restricting device for applying motor outlet pressure to the larger area of the torque sensing piston, and means for urging said torque sensing piston toward a position to establish a minimum stroke position for said axial pistons, said torque sensing piston areas being related to permit a range of positions of said axial pistons with different values of pressure difference between said supply and return lines.

6. A power drive unit comprising, a variable displacement motor including an adjustable wobbler, a first valve connected to ports of the motor for controlling the direction of fluid flow to the motor, means for setting the position of said first valve, a fluid circuit including supply and return lines and with said lines extended to said first valve, a control cylinder for said wobbler including a piston connected to the wobbler, a servo valve for directing operating fluid to and from said control cylinder, a torque sensing piston member having differential areas, means mechanically connecting said servo valve and said torque sensing piston whereby movement of the torque sensing piston causes movement of the servo valve, means for applying motor inlet pressure to the lesser area of the torque sensing piston, means for applying motor outlet pressure to the larger area of the torque sensing piston, and means for urging said torque sensing piston toward a position to establish a minimum displacement position for said motor, said torque sensing piston areas being related to permit a range of displacement of said motor with different values of pressure difference across said motor.

7. A power drive unit for thrust reverser structure operable in opposite directions between stowed and deployed positions and which imposes varying load demands on the unit including operating mechanism for said structure having a variable displacement hydraulic motor, means for setting said motor at a minimum displacement condition for high speed operation, at a maximum displacement condition for lower speed higher torque operation or at any condition therebetween, means for causing fluid flow through said motor in one direction in a stow operation and in the opposite direction in a deploy operation, and means responsive to the load on the motor in either direction of operation thereof by measuring the pressure drop across the motor without loss of energy in the fluid to set the motor displacement at the least value possible for the load condition on the motor.

8. A power drive unit as defined in claim 7 wherein said motor-setting means includes a control cylinder with a piston, and said load-responsive means includes a piston member having opposed areas responsive one to motor inlet pressure and the other to motor outlet pressure to sense the pressure drop across the motor, a servo valve for controlling the control cylinder piston interconnected with said piston member to respond to movement of the latter, and feedback means between the control cylinder piston and the servo valve.

9. A power drive unit as defined in claim 8 wherein said opposed areas of the piston member are different with the larger area being responsive to motor outlet pressure which together with a spring acting on the piston member functions to urge the piston member to a position to set the minimum displacement condition, the differential areas of the piston member being selected whereby a load increase on the motor which results in a predetermined reduction of motor outlet pressure causes the load-responsive means to establish the maximum displacement condition.

10. A power drive unit for structure operable in opposite directions and which imposes varying load demands on the unit including operating mechanism for said structure having a variable displacement hydraulic motor, means for setting said motor at a minimum displacement condition for high speed operation, at a maximum displacement condition for lower speed higher torque operation or at any condition therebetween, means for causing fluid flow through said motor in either of two directions, and means responsive to the load on the motor in either direction of operation thereof by measuring the pressure drop across the motor without loss of energy in the fluid to set the motor displacement at the least value possible for the load condition on the motor.

* * * * *